(12) United States Patent
Hsieh et al.

(10) Patent No.: US 7,210,151 B2
(45) Date of Patent: Apr. 24, 2007

(54) HEAT DISSIPATION MEMBER FOR AN OPTICAL DISK DRIVE

(75) Inventors: Chih-Chung Hsieh, Hsinchu (TW); Jeng-Jiun Chen, Hsinchu (TW)

(73) Assignee: Lite-On IT Corporation, Taipei (TW)

( * ) Notice: Subject to any disclaimer, the term of this patent is extended or adjusted under 35 U.S.C. 154(b) by 436 days.

(21) Appl. No.: 10/889,387

(22) Filed: Jul. 12, 2004

(65) Prior Publication Data

US 2005/0060729 A1 Mar. 17, 2005

(30) Foreign Application Priority Data

Sep. 15, 2003 (TW) .............................. 92125297 A

(51) Int. Cl.
*G11B 33/14* (2006.01)
(52) U.S. Cl. ..................................................... 720/649
(58) Field of Classification Search ................ 720/649, 720/671, 658
See application file for complete search history.

(56) References Cited

U.S. PATENT DOCUMENTS

| | | | | |
|---|---|---|---|---|
| 6,871,351 B2* | 3/2005 | Yamauchi et al. | .......... | 720/671 |
| 7,124,420 B2* | 10/2006 | Murata et al. | .............. | 720/671 |
| 7,137,130 B2* | 11/2006 | Murata et al. | .............. | 720/649 |
| 2004/0154033 A1* | 8/2004 | Onozawa et al. | ........... | 720/648 |
| 2004/0184367 A1* | 9/2004 | Lee et al. | ................. | 369/44.11 |
| 2005/0025002 A1* | 2/2005 | Saito et al. | .............. | 369/44.37 |
| 2006/0072387 A1* | 4/2006 | Schleipen | ................ | 369/44.19 |

\* cited by examiner

*Primary Examiner*—Allen Cao
(74) *Attorney, Agent, or Firm*—Thomas, Kayden, Horstemeyer & Risley

(57) ABSTRACT

The present invention provides a heat dissipation member for use in the optical disk drive. The present invention includes an outer frame and a chassis. The chassis has a drive module, a pickup module and two guide rods. A heat dissipation member is disposed on the pickup module and is in contact with a laser diode of the pickup module. When the drive module spins the optical disk at a rotational speed, an air flow is produced due to spinning of optical disk. A part of the air flow is directed to flow through the laser diode by the heat dissipation member so that excess heat generated by the laser diode is efficiently dissipated.

7 Claims, 5 Drawing Sheets

HEAT DISSIPATION MEMBER FOR AN OPTICAL DISK DRIVE

BACKGROUND OF THE INVENTION

1. Field of the Invention

The present invention relates to an optical disk drive, and in particular to a heat dissipation member that is effective in dissipating heat from a laser diode of a pickup module and preventing the laser diode from overheating.

2. Description of the Prior Art

Optical disk drives are becoming more popular in the market, and the optical disk drives are considered as standard equipment on personal computer for several years. A pickup module such as optical pickup head is one of the key components implemented in the optical disk drive. FIGS. 1 and 2 illustrate the conventional optical disk drive and its key components. For simplicity, an upper cover and a lower cover of the conventional optical disk drive are removed. Referring to FIG. 1, the conventional optical disk drive has an outer frame 1a and a chassis 2a. As shown in FIG. 2, the chassis 2a has a drive module 3a, a pickup module 4a and guide rods 51a and 52a. The guide rods 51a and 52a are respectively disposed on the chassis 2a. The pickup module 4a can be slidably mounted on the guide rods 51a and 52a and has a laser diode 41a which is used to generate laser beam for reproducing or recording. Besides, the drive module 3a is used to spin optical disk at a rotational speed when the optical disk drive is in use.

However, the temperature of the laser diode 41a can be usually higher than the temperature within the optical disk drive and ambient temperature. If temperature of the laser diode 41a is too high, then it may have detrimental impact on performance of the laser diode 41a. In prior art, temperature of the laser diode 41a cannot be kept constant, so the laser diode 41a will fail for a long time.

Thus, there is need to development for a heat dissipation member for use in an optical disk drive.

SUMMARY OF THE DISCLOSURE

It is an object of the present invention to provide a heat dissipation member for use in the optical disk drive.

It is another object of the present invention to provide a heat dissipation member for use in the optical disk drive that can efficiently dissipate heat generated by a laser diode.

In order to accomplish the object of the present invention, the present invention provides a heat dissipation member for use in the optical disk drive. The present invention includes an outer frame and a chassis. The chassis has a drive module, a pickup module and two guide rods. A heat dissipation member is disposed on the pickup module and is in contact with a laser diode of the pickup module. When the drive module spins the optical disk at a rotational speed, airflow is produced due to spinning of optical disk. A part of the air flow is directed to flow through the laser diode by the heat dissipation member so that excess heat generated by the laser diode is efficiently dissipated.

BRIEF DESCRIPTION OF DRAWINGS

The present invention can be fully understood from the following detailed description and preferred embodiment with reference to the accompanying drawings in which.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the embodiments of the present invention are described below in connection with DVD-ROM drives, the present invention can be applied to all optical disk drive, including but not limited to CD-ROM drives, CD-RW drives, DVD-RAM drives, DVD-RW drives, DVD+RW drives, COMBO drives, car audio players, external drives, as well as all other optical media recorders and players.

Figure 1:
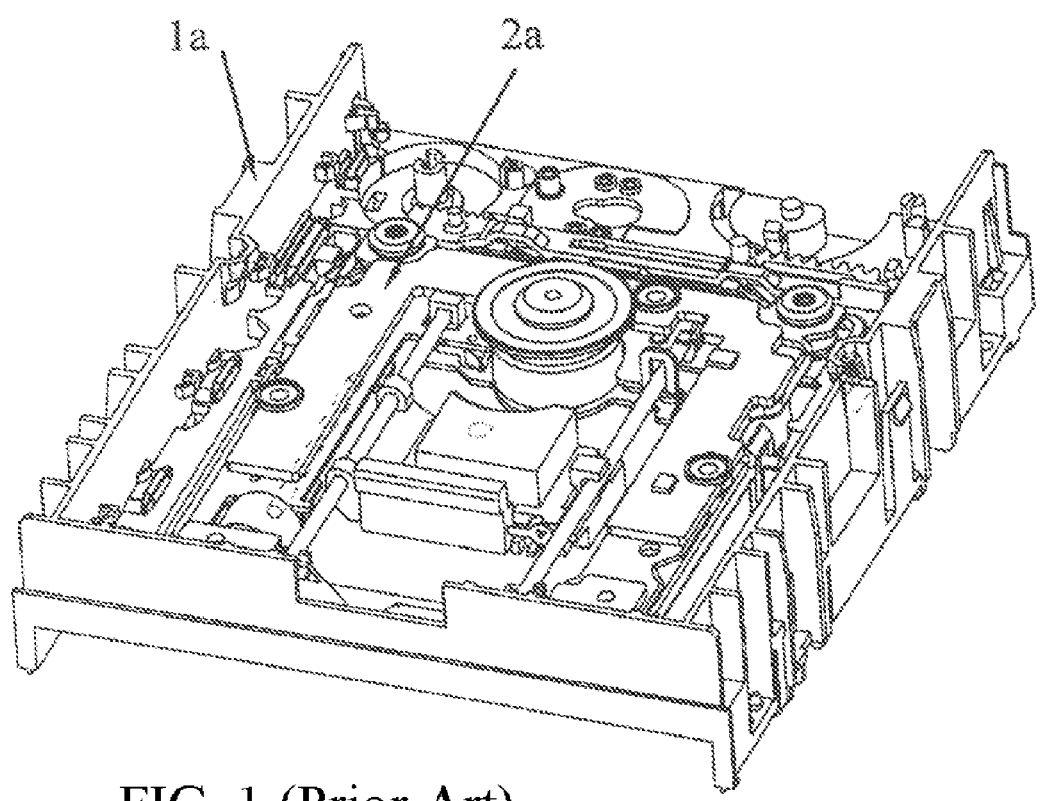
FIG. 1 is a perspective view of a conventional optical disk drive with a top cover and a lower cover removed.
Figure 2:
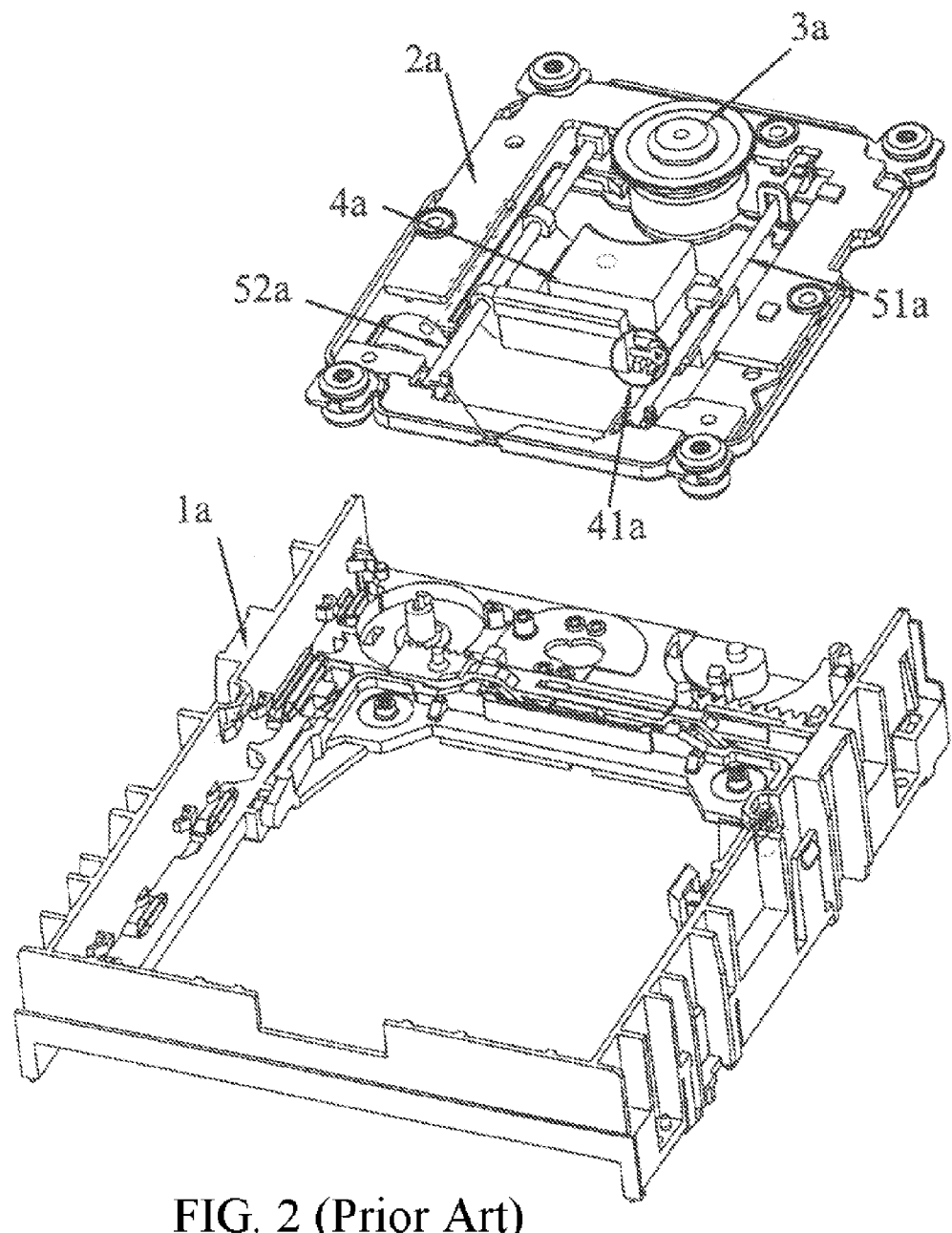
FIG. 2 is an exploded perspective view of a conventional optical disk drive of FIG. 1.
Figure 3:
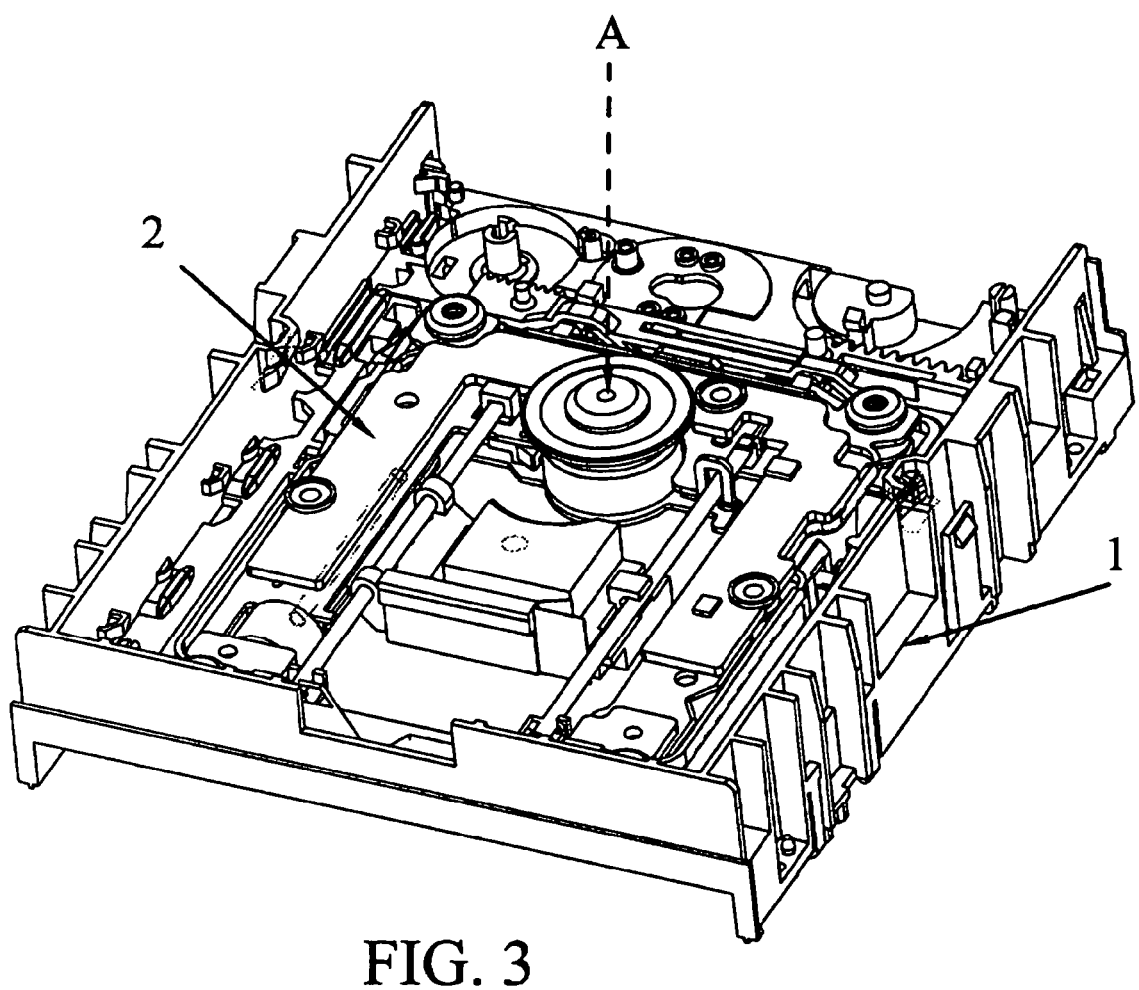
FIG. 3 is a perspective view of the optical disk drive in accordance with the present invention.
Figure 4:
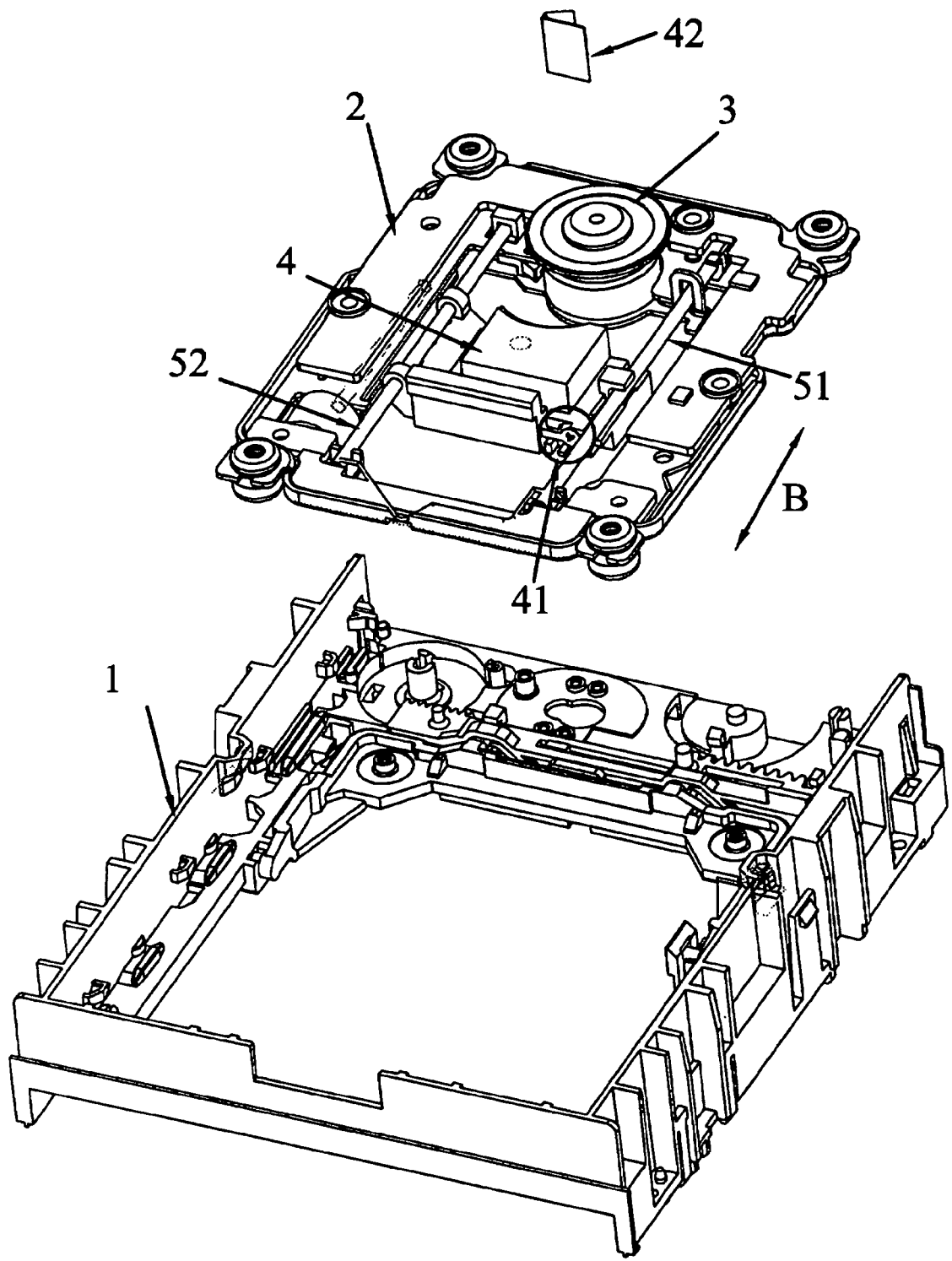
FIG. 4 is an exploded perspective view of the optical disk drive of FIG. 3.

FIGS. 3 and 4 illustrate an optical disk drive according to embodiment of the present invention. Referring to FIGS. 3 and 4, the present invention includes an outer frame 1 and a chassis 2, and the chassis 2 is positioned within the outer frame 1. As shown in FIG. 4, the chassis 2 has a drive module 3, a pickup module 4, a heat dissipation member 42 and two guide rods 51 and 52. The outer frame 1 of the present invention can be the same as the outer frame 1a of the conventional optical disk drive. Further referring to FIG. 4, the drive module 3 is positioned on the chassis 2 and is used to support and spin optical disk (not shown). The pickup module 4 is slidably mounted on the guide rods 51 and 52 which are respectively positioned at the chassis 2, and the guide rods 51 and 52 are substantially parallel each other. Besides, the heat dissipation member 42 is fixedly positioned at the pickup module 4, and the heat dissipation member 42 can also be attached to the pickup module 4 by adhesive or clamping device. The heat dissipation member 42 can be made of thermally conductive materials ( i.e. material with high thermal conductivity). For example, the heat dissipation member 42 can be made of, but not limited to copper, steel and iron etc. The pickup module 4 can slide along the guide rods 51 and 52, i.e. in the direction of arrow B of FIG. 4 when the optical disk drive is in use. The pickup module 4 also has a laser diode 41 which is used to generate a laser beam for recording or reproducing.

Further referring to FIGS. 3 and 4, after the optical disk (not shown) is placed on the drive module 3, the optical disk is driven by the drive module 3 at a rotational speed. Then, the laser diode 41 of the pickup module 4 will emit a laser beam so that recording or reproducing can be performed. Meanwhile, the laser diode 41 does not only emit a laser beam but also generate heat. In accordance with one embodiment of the present invention, the heat dissipation member 42 is fixedly positioned at the pickup module 4 and is in direct contact with the laser diode 41.

Figure 6:
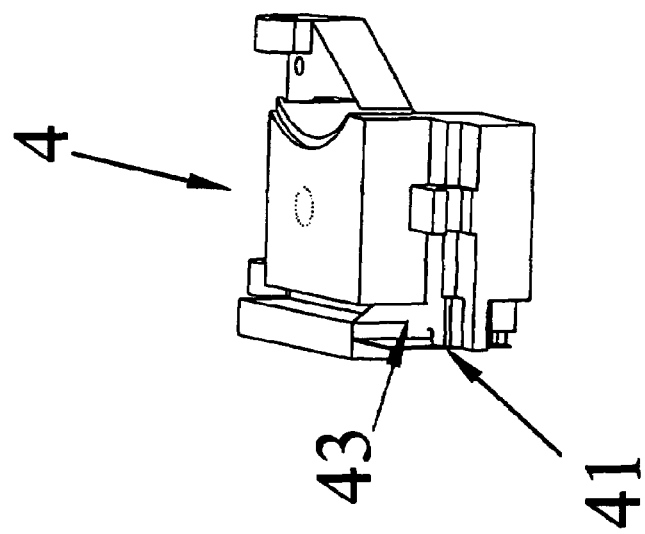
FIG. 6 is another perspective view of the pickup module in accordance with the present invention.
Figure 5:
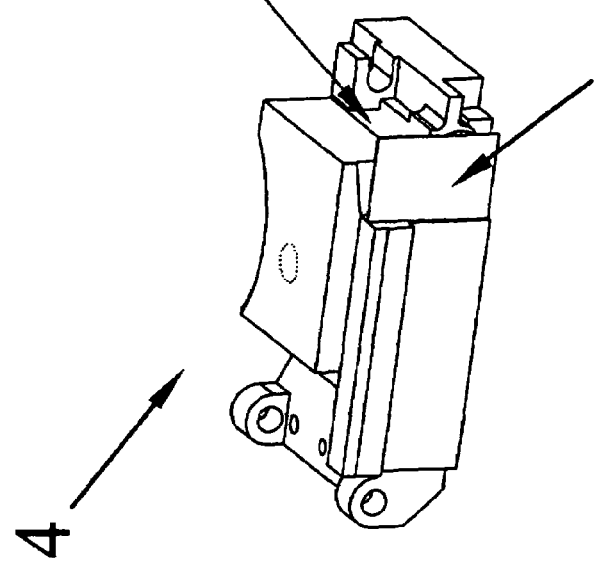
FIG. 5 is an enlarged perspective view of a pickup module in accordance with the present invention.

Referring to FIG. 3, when the optical drive is in use, the optical disk (not shown) spins clockwise as viewed along arrow A (the top perspective view of FIG. 3). Airflow within the optical disk drive is driven by the optical disk and flows substantially clockwise. As described above, when the optical disk drive is in use, the laser diode 41 emits a laser beam and generates heat. Referring to FIGS. 5 and 6, a guide groove 43 is defined by the heat dissipation member 42 and the pickup module 4. The guide groove 43 is positioned toward the guide rod 51 as shown in FIGS. 5 and 6 so that airflow will be guided to flow through the laser diode 41 and heat of the laser diode 41 is efficiently dissipated to the airflow through the heat dissipation member 42. In addition, to have the better transfer of heat from the laser diode 41 to airflow within the optical disk drive, some type of thermal interface material is placed between the laser diode 41 and the heat dissipation member 42. The thermal interface material can be made of, but not limited to zinc-base white grease, special pads or double-stick tapes. Using the thermal interface material and the airflow within the optical disk drive, heat dissipation from the laser diode 41 can improve dramatically. In this regard, if the heat dissipation member 42 is made of material with higher thermal conductivity, then heat generated by the laser diode 41 is more efficiently dissipated.

While the invention has been described with reference to the preferred embodiments, the description is not intended to be construed in a limiting sense. It is therefore contemplated that the appended claims will cover any such modifications or embodiments as may fall within the scope of the invention defined by the following claims and their equivalents.

What is claimed is:

1. An optical disk drive, comprising:
   an outer frame;
   a chassis, positioned within the outer frame;
   two guide rods, respectively positioned at the chassis;
   a drive module, positioned on the chassis;
   a pickup module, including a laser diode and slidably mounted on two guide rods; and
   a heat dissipation member, positioned at the pickup module and in contact with the laser diode,
   whereby airflow within the optical disk drive is guided to flow through the laser diode by the heat dissipation member and heat of the laser diode is dissipated through the heat dissipation member when the drive module spins an optical disk.

2. The optical disk drive as claimed in claim 1, wherein the heat dissipation member is made of material with higher thermal conductivity.

3. The optical disk drive as claimed in claim 1, wherein the heat dissipation member can be made of copper, steel and iron.

4. The optical disk drive as claimed in claim 1, further comprising a thermal interface material which is positioned between the laser diode and the heat dissipation member.

5. An optical disk drive, comprising:
   an outer frame;
   a chassis, positioned within the outer frame;
   two guide rods, respectively positioned at the chassis;
   a drive module, positioned on the chassis;
   a pickup module, including a laser diode and slidably mounted on two guide rods;
   a heat dissipation member, positioned at the pickup module and in contact with the laser diode; and
   a thermal interface material, positioned between the laser diode and the heat dissipation member,
   whereby airflow within the optical disk drive is guided to flow through the laser diode by the heat dissipation member and heat of the laser diode is dissipated through the heat dissipation member when the drive module spins an optical disk.

6. The optical disk drive as claimed in claim 5, wherein the heat dissipation member is made of material with higher thermal conductivity.

7. The optical disk drive as claimed in claim 5, wherein the heat dissipation member can be made of copper, steel and iron.

* * * * *